US012441451B2

(12) United States Patent
Richmond

(10) Patent No.: US 12,441,451 B2
(45) Date of Patent: Oct. 14, 2025

(54) METHOD AND APPARATUS FOR TREATING STRUCTURAL MOISTURE IN BOATS

(71) Applicant: DryBoat South, LLC, Grand Rapids, MI (US)

(72) Inventor: Scott Richmond, Comstock Park, MI (US)

(73) Assignee: DryBoat South, LLC, Grand Rapids, MI (US)

( * ) Notice: Subject to any disclaimer, the term of this patent is extended or adjusted under 35 U.S.C. 154(b) by 509 days.

(21) Appl. No.: 17/697,644

(22) Filed: Mar. 17, 2022

(65) Prior Publication Data

US 2022/0297815 A1 Sep. 22, 2022

Related U.S. Application Data

(60) Provisional application No. 63/162,313, filed on Mar. 17, 2021.

(51) Int. Cl.
*B63J 2/02* (2006.01)
*B63J 2/12* (2006.01)
*F24F 3/14* (2006.01)

(52) U.S. Cl.
CPC . *B63J 2/02* (2013.01); *B63J 2/12* (2013.01); *F24F 3/14* (2013.01); *F24F 2003/144* (2013.01)

(58) Field of Classification Search
CPC ........ B63J 2/00; B63J 2/02; B63J 2/12; F24F 3/00; F24F 3/14; F24F 2003/144
USPC .......................................................... 114/211
See application file for complete search history.

(56) References Cited

U.S. PATENT DOCUMENTS

| 6,629,507 | B2 * | 10/2003 | Biddison | ................. | B63B 1/042 |
| | | | | | 114/271 |
| 6,691,427 | B1 * | 2/2004 | Fernandes | ............. | F26B 21/086 |
| | | | | | 34/103 |
| 9,051,727 | B1 * | 6/2015 | Carlton | ................... | F26B 9/003 |
| 10,717,505 | B2 * | 7/2020 | Richmond | ............ | F26B 21/083 |

* cited by examiner

*Primary Examiner* — Lars A Olson
(74) *Attorney, Agent, or Firm* — Warner Norcross + Judd LLP

(57) ABSTRACT

A method for removing internal moisture which tends to collect in the hulls, deck, stringers, transoms, bulkheads, spars, and other boat structures. Air injection bores are formed in the core or other boat structure in the vicinity of unwanted moisture. Pressurized injection air is injected into the bores through a plurality of air injection lines running from a source of pressurized injection air. The temperature of the air being injected into bores is varied as a function of the temperature and/or relative humidity of ambient air at or near the bores.

23 Claims, 6 Drawing Sheets

METHOD AND APPARATUS FOR TREATING STRUCTURAL MOISTURE IN BOATS

CROSS REFERENCE TO RELATED APPLICATION

This application claims priority to Ser. No. 63/162,313 filed Mar. 17, 2021, entitled METHOD AND APPARATUS FOR TREATING STRUCTURAL MOISTURE IN BOATS.

FIELD OF THE INVENTION

The present invention relates to removing internal moisture which tends to collect in the hulls, decks, stringers, transoms, bulkheads, spars, and other boat structures.

BACKGROUND

Moisture in the hull, deck or other boat structures tends to weaken the structural components. Boat hulls today often include a wood or foam core coated with fiberglass, to form a fiberglass outer skin. However, moisture can still enter the wood or foam coring jeopardizing the structural integrity of the vessel.

Even polymeric foam cores and other structural components can be weakened by moisture penetration. Whether the structure is wood or polymeric foam, moisture penetration may cause the boat to become too weak to operate safely in the water; or it may be a source of toxic mold or cause of other respiratory problems. Further, the boat may be un-insurable when moisture enters the coring. Thus, the coring may have to be cut, or removed and then rebuilt.

U.S. Pat. No. 9,945,612, issued Apr. 17, 2018 discloses a method for drying wood coring in boats patent, comprising the steps of: piercing the fiberglass outer skin of the boat, forming bores or holes in the wood coring to form an exposed portion and injecting dry air into the bores through tubes inserted into the bores.

SUMMARY OF THE INVENTION

In one aspect of the present invention, bores are formed in the core or other structure in the vicinity of unwanted moisture, air injection lines from a source of pressurized are inserted into the bores, and the temperature of the air being injected into the bores may be varied as a function of the temperature and/or relative humidity of the injected air at or near the bores.

In another aspect of the invention, pressure of the air being injected may be varied as injected into all or a portion of the bores. Multiple pressure regulators may be located in the air injection system, each controlling the flow of air into at least one or a group of several bores, so that the air flow and pressure into each pressure regulated line or group of lines can be individually monitored and controlled.

In another aspect of the invention, one or more variable output pumps may be used to control the flow of air to all to the injection lines and into the bores which they feed.

In another aspect of the invention, an output pump and/or a vacuum pump may be used in the process of passing air into and out of the bores in the structural member(s).

In another aspect of the invention, perforated stainless steel tubes are located on the ends of the injection lines for inserting into the bores. They facilitate deeper penetration and create localized heat within the bores because of air friction in the stainless steel tubes.

In another aspect of the invention, the method includes creating a chine into the curved or angular hull of the boat and direct the bores generally upwardly into and beyond the created chine. A chine is a sharp change in the angle in the cross section of a boat hull.

In another aspect of the invention, the bores are formed so as to radiate outwardly in different directions from a point of entry into the hull or other structure being treated.

These and other objects, advantages and features of the invention will be understood by reference to the description of the preferred embodiments, including the appended drawings.

DESCRIPTION OF THE PREFERRED EMBODIMENTS

Figure 1:
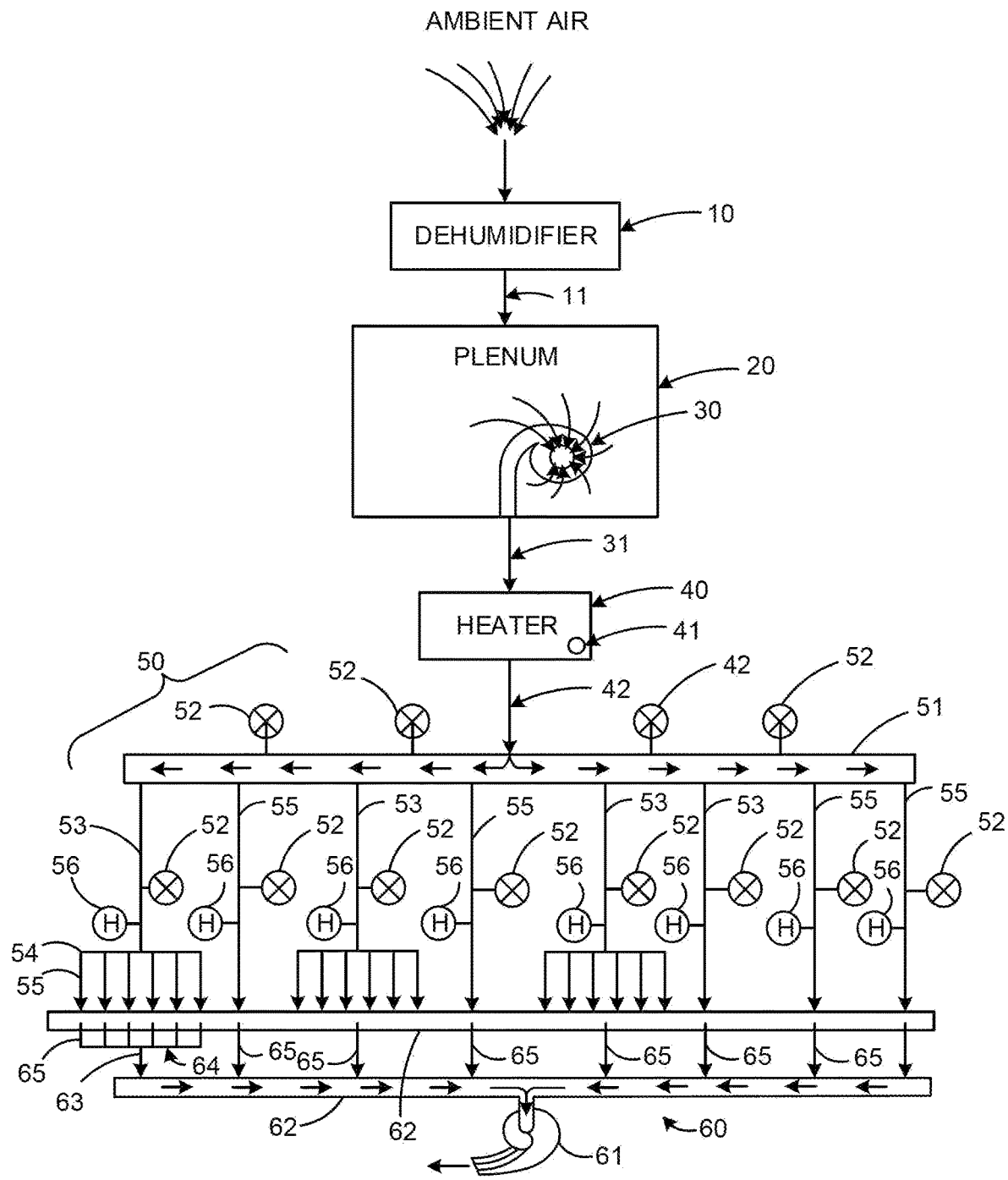
FIG. 1 is a schematic view of the drying system.
Figure 2:
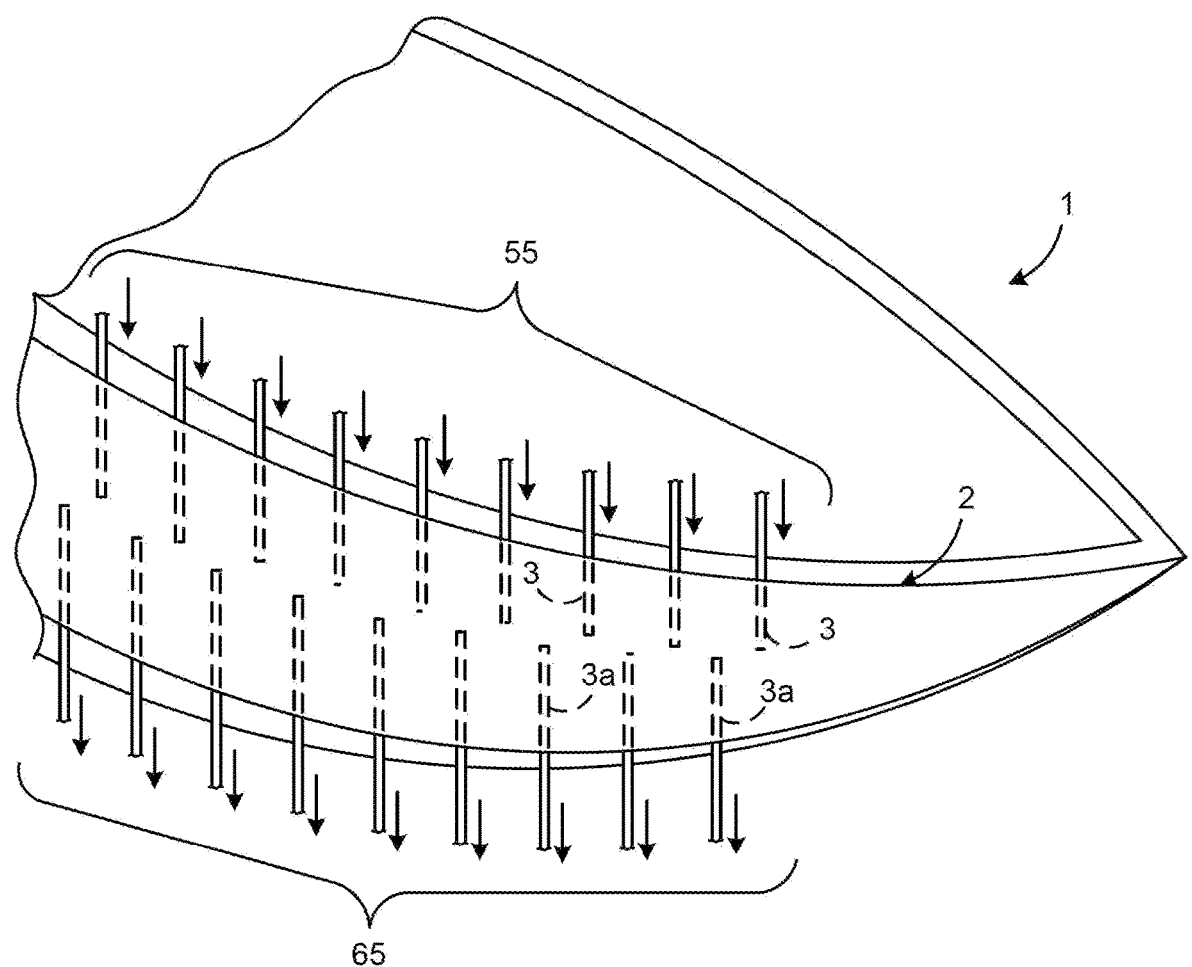
FIG. 2 is a broken schematic view of a boat having drying air input lines entering the core of a hull from its top and spent air being drawn out of bores through the bottom of the hull via vacuum lines.

In a preferred embodiment, the method and apparatus comprise a dehumidifier 10, a plenum 20, an air pump 30, a heater 40, a drying air delivery network 50, and a spent air withdrawal system 60. (FIG. 1). Ambient air is drawn into a dehumidifier by air pump 30. The dehumidified air is drawn into plenum 20, from which it is withdrawn by air pump 30 and pumped to heater 40. From heater 40, heated drying air is pumped through drying air delivery system 50 via injector tubes 55 inserted into bores 3 drilled into moist wood or polymeric foam to be treated, such as the hull core 2 of a boat 1 (FIG. 2). In one preferred embodiment, the spent drying air is withdrawn from the moist structural material being treated by a vacuum pump 61, which draws the spent drying air through air withdrawal network 60, also connected to the treated structure by being inserted via withdrawal lines 65 inserted to bores 3a in the structure being treated. In one embodiment, the temperature of the hot air being injected into the bores is varied as a function of the temperature and/or relative humidity of the injected air at or near the bores 3.

COMPONENTS

1 Boat
2 Structural Component, e.g. hull core, stringer, deck, transoms, bulkheads, spars and other boat structures
3 Drying air inlet bores, also referred to as injection bores 3a Vacuum withdrawal bores, also referred to as outlet bores
4 Polymeric/fiberglass skin
7 Bottom of boat
8 Side of boat
10 Dehumidifier
20 Plenum
30 Variable speed air pump
40 Heater
50 Drying air delivery system
   51 Main drying air delivery conduit
   52 Pressure regulators
   53 Drying air delivery line to manifold
   54 Drying air delivery manifold
   55 Drying air delivery lines to inlet bores, also referred to as injector lines
   55a Stainless steel perforated delivery tube
60 Spent air vacuum recovery system
   61 Vacuum pump
   62 Main vacuum conduit
   63 Vacuum line to manifold
   64 Vacuum manifold
   65 Vacuum line to vacuum withdrawal bores Dehumidifier 10 can usually be any of a variety of available dehumidifiers such as refrigerant dehumidifiers, heat pump dehumidifiers, ventilator dehumidifiers, condensate dehumidifiers, ionic dehumidifiers, ionic dehumidifier and desiccant dehumidifiers. I have found it to be most effective to dehumidify the air prior to heating. Dehumidified air is delivered through a conduit 11 into plenum 20. The purpose of plenum 20 is to ensure that air pump 30 is never starved for dehumidified air to deliver to heater 40. The volume of plenum 20 is a function of the delivery capacity of air pump 30 located in plenum 20. Different capacities are used as a function of the size of the boat being treated. Pump 30 would usually be within the range of delivering 100 to 1,000 cfm (cubic feet per minute). Plenum 20 preferably has a volume which is twice the cfm delivery rate of pump 30. Thus, for a 100 cfm pump 30, plenum 20 would have a volume of 200 cubic feet. For a 1,000 cfm pump 30, plenum 20 would have a volume of 2,000 cubic feet.

Air pump 30 is preferably a variable output centrifugal blower, which pumps the dehumidified air into heater 40 via insulated conduit 31. A variable output air pump helps the user to control the volume of heated air being delivered differentially to different parts of drying air delivery system 50. Heater 40 is itself insulated from the ambient air and is controlled by a thermostat controller 41. Preferably, the dehumidified heated air being delivered by heater 40 is heated to between 80 to 220 degrees Fahrenheit.

Heater 40 delivers the heated drying air to delivery system 50 via insulated conduit. Insulated 4 inch diameter hose works well. Typically, delivery system 50 includes an elongated main drying air delivery conduit 51 (preferably PVC pipe) which can be positioned alongside the boat being treated. Drying air flows from conduit 51 into a series of delivery lines (hoses or flexible tubes) which extend from it. A delivery line 55 may extend directly from conduit 51 and into a drying air inlet bore 3 in the structure being treated (FIG. 1.) Alternatively, an intermediate drying air delivery line 53 may extend from main conduit 51 to a drying air delivery manifold 54. Manifold 54 then includes multiple drying air delivery lines 55 (typically 6 to 12) which extend into drying air inlet bores 3 in the structure to be treated.

Heater 40 is optional, in that the heated drying air can be delivered in other ways. The air being delivered is always heated, even without a dedicated "heater." The variable speed air pump itself always creates heat by its nature. By varying the speed of the air pump or varying the size of its air delivery opening, we can control and vary the temperature of the air being delivered. From there, the amount of restriction in the delivery conduit 51, the delivery manifold 54, the delivery lines 55, and the stainless steel delivery nozzle 55a can be varied by changing line, manifold and nozzle diameters to control the temperature of the air being delivered.

In one exemplary preferred embodiment of the present invention, the bores 3 are spaced apart by a distance of about 8 inches. In one exemplary preferred embodiment of the present invention, the bores 3 may have a diameter of about ½ of an inch. In one exemplary preferred embodiment of the present invention, the bores 3 may have a diameter of about ¼ of an inch.

The processing of ambient air may include removing at least 50% or at least about 50% of the moisture from ambient air. The dehumidifying step 10 may employ the use of a dehumidifier to convert ambient air into processed air or ultra-dry air. The pumping or displacing of dry air into the bores 3 may be performed by using air injection hoses that are adapted to fit the bores 3.

Figure 2A:
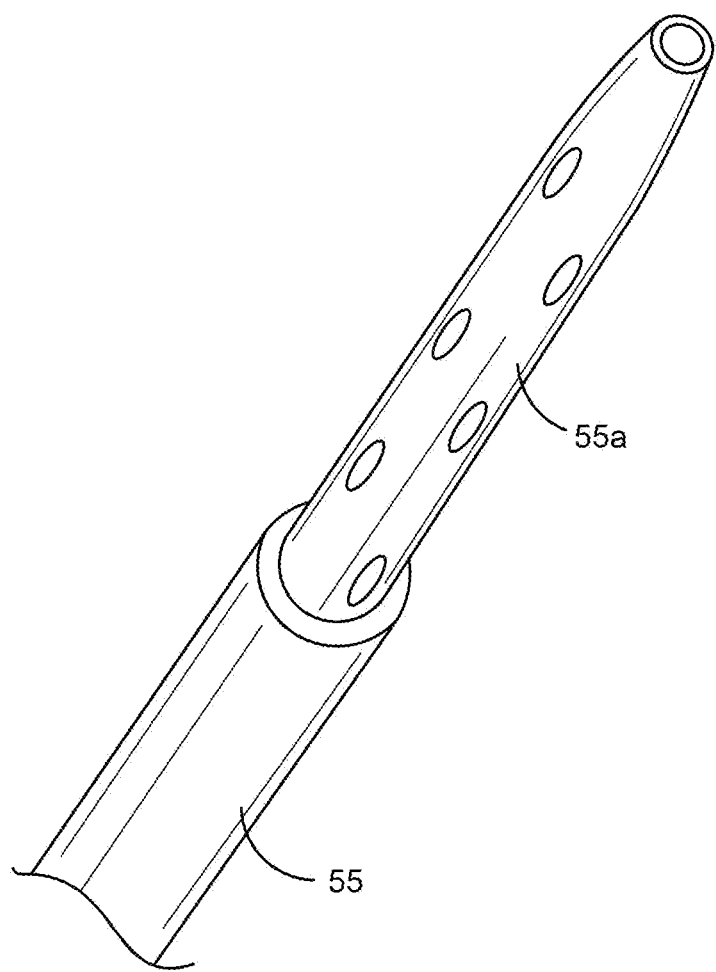
FIG. 2a is a perspective view of an insulated injection hose terminating in a perforated stainless steel tip.

The open end of each delivery line 55 can simply be inserted into an injection bore 3. However, preferably, a perforated stainless steel injector tube 55a extends from the end of injector hose 55 (FIG. 2A) and is inserted into the receiving bore 3. Heat is generated in tube 55a through friction from the air flowing through it. Further, the stainless steel radiates the heat into the wood or foam surrounding injection bore 3. The perforation holes also help distribute the drying air into the structure surrounding injection bore 3.

Preferably, pressure regulators are positioned at several points along the length of conduit 51 such that the volume of air flowing to various sections of delivery system 50 can be differentially controlled. In addition, it is preferable that a pressure regulator control the flow of draying air to each manifold feeding hose 53, and each hose 55 extending directly to an injection bore 3.

In use, one can measure the temperature and relative humidity (hygrometer 56) at least at one hose entry point per manifold. We want to maximize heat and minimize humidity at the point of entry into the boat. A handheld hygrometer can be used to determine/confirm where the moisture problem is worst. A hygrometer 56 which also incorporates a digital thermometer can be used at the end of each dry air injection line to determine the relative humidity and temperature of the drying air. By selectively adjusting the flow output of variable pump 30, the heater controller 41 to adjust the temperature to which the drying air is heated, and/or the pressure regulators, one can tailor the flow, temperature and humidity of the drying air being injected into each of, or each group of, the drying air injector lines 55 into the structure being treated.

In one embodiment, a hygrometer 56 measuring moisture and temperature is placed on each drying air delivery line 53 or 55. Software controlling pressure regulators 52, heat controller 41 and the output of variable flow pump 30 as a function of the temperature and humidity of drying air at each hygrometer 56 could be used to control the system.

In another embodiment, a vacuum pump 61 (preferably a centrifugal blower) is connected to the structure being treated via an air withdrawing system 60. Withdrawing system 60 includes a PVC main line 62, from which air lines 65 extend and are inserted into vacuum withdrawal/outlet bores 3a formed into the structure being treated. Alternatively, some withdrawing lines 65 may extend from manifolds 64, which in turn is connected to main line 62 via feeder lines 63. In essence, withdrawing system 60 is the mirror image of injection system 50. By simultaneously operating vacuum pump 61 in tandem with injection pump 30, drying air is injected into the moist structure via bores 3 and is drawn through the porous wood or polymeric foam core and out through withdrawing lines 65 which are inserted into air withdrawal/outlet bores 3a as moisture bearing "spent drying air. Bores 3a have similar placement spacing and diameters as exemplified for bores 3 above.

Figure 3:
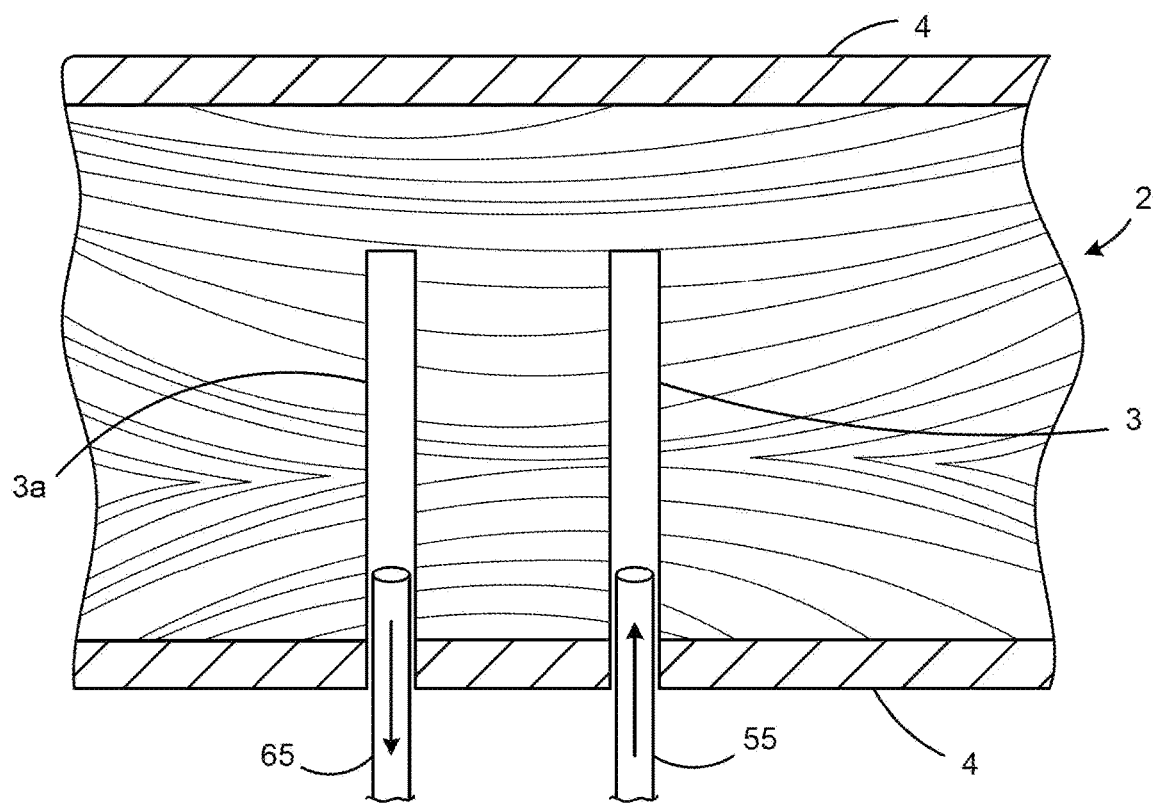
FIG. 3 is a cross sectional view of a section of hull having injection and vacuum lines inserted side by side.
Figure 4:
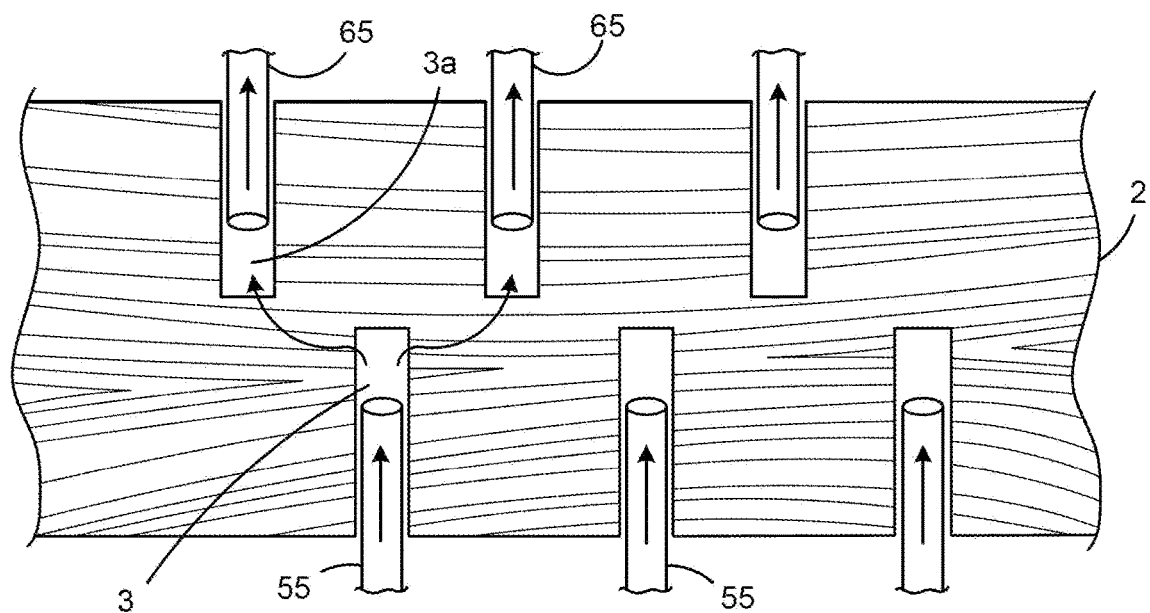
FIG. 4 is a cross sectional view of a structural member having injection lines feeding bores on one side, and vacuum lines withdrawing air from the other side.

Preferably, the injection bores 3 and withdrawal/outlet bores 3a are formed do as to terminate in proximity to one another, such the through flow of drying air from bores 3 to outlet bores 3a is not overly hindered. In FIG. 2, injection bores are drilled down into the hull core 2 or other structure from its top edge and outlet bores 3a are drilled upwardly into hull core 2 through a chime extending along the bottom of the structure. In FIG. 3, injection bores 3 are drilled through the fiber glass skin 4 and into core 2 adjacent to outlet bores 3a similarly drilled adjacent to bores 3. In FIG. 4, injection bores are drilled into structure 2 from one side, and withdrawal/outlet bores 3a are drilled in from the other side, such that the inner ends of the bores are relatively near each other, and in alternating fashion. Thus, air injected into an injection bore 3 by injector line 55 is drawn through the moisture laden structure to the left and right of the injection bore 3 and is drawn out as spent drying air though adjacent outlet bores 3a and through the withdrawal lines 65 of the spent air withdrawal system.

Figure 5:
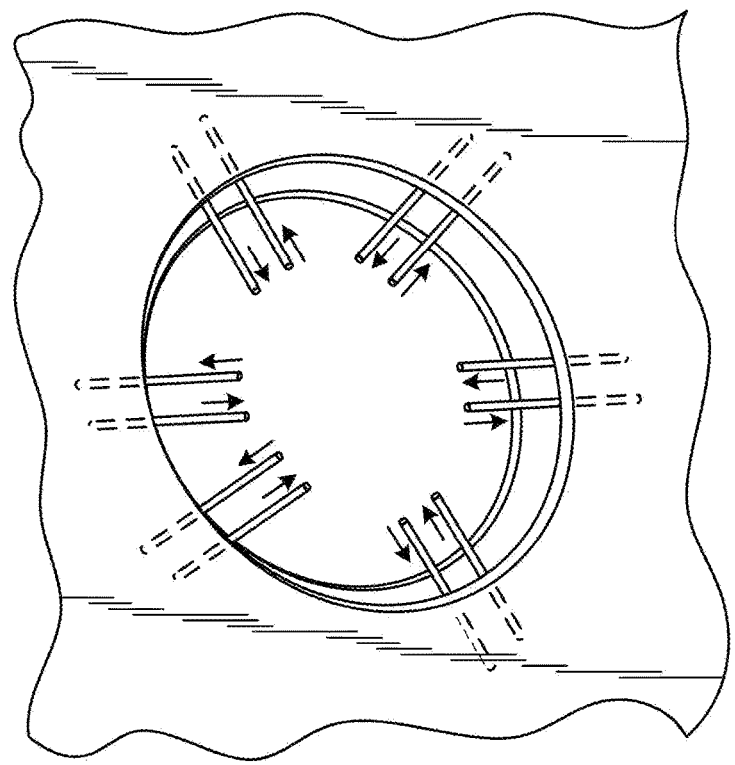
FIG. 5 is a fragmentary view of a port having injection and vacuum lines radiating from the port opening.
Figure 6:
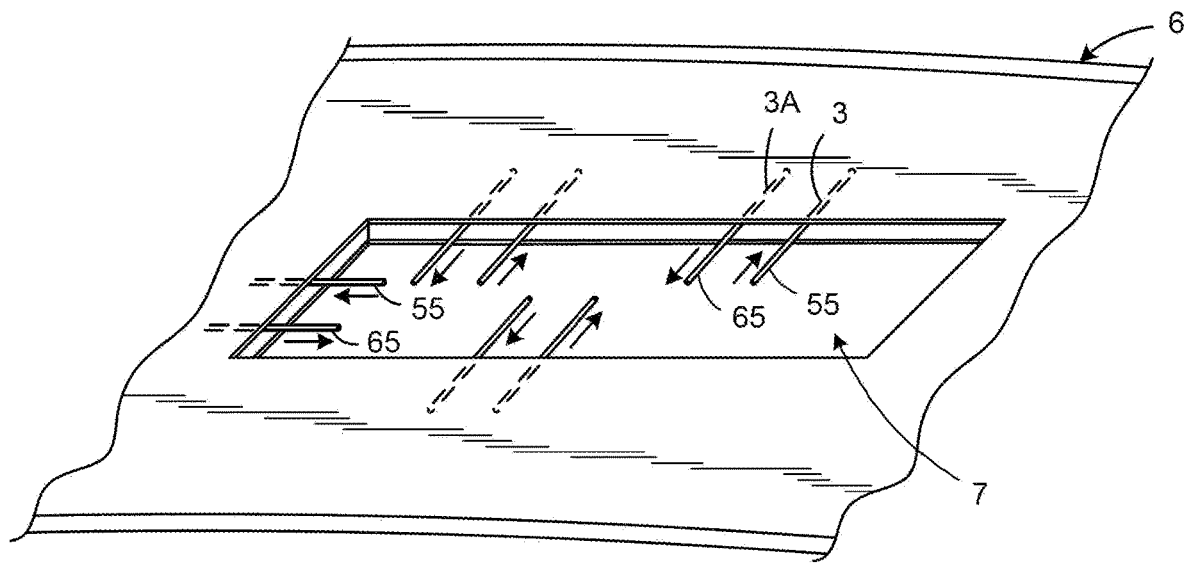
FIG. 6 is a perspective view of an open deck hatch having injection and vacuum lines radiating from different sides of the opening.

In FIG. 5, alternating injection lines 55 and withdrawal lines 65 are injected into alternating injection bores 3 and withdrawal bores 3a which are drilled radially into the surrounding core through the circular interior edge of the port. In FIG. 6, injection lines 55 and withdrawal lines 65 are inserted into adjacent injection bores 3 and outlet bores 3a extending inwardly into a deck structure 6 through the edges of a hatch opening 7.

Often, the side of the hull of a boat juts inwardly at about or slightly below the waterline, creating a chine running lengthwise along the side of the hull. Often this occurs near where the totally fiberglass bottom of the hull meets with the side of the hull, which typically is made of a structural wood of foam core, covered by fiberglass sheeting on either side of the core. Since the chine faces downwardly, it offers a convenient surface to drill injection bores 3 or outlet bore 3a upwardly into for purposes of treating a moisture laden portion of the side wall of the hull.

Figures 7, 7A:
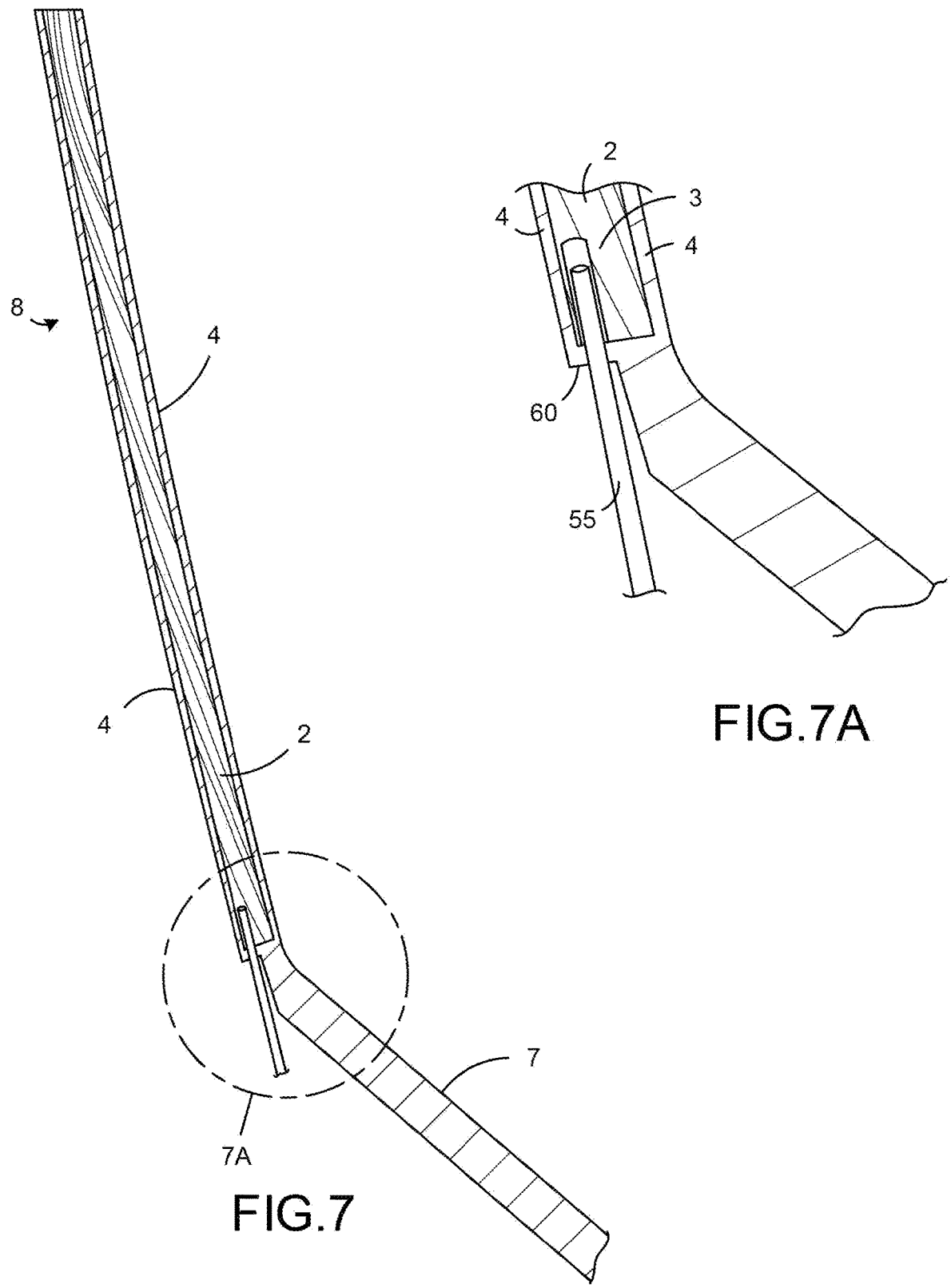
FIG. 7 is a cross sectional view of a portion of the hull of a boat having a chine created in it to facilitate chine insertion of the injection or vacuum lines.
FIG. 7A is an enlargement of circled area 7A of FIG. 7.

However, some boats do not have such a chine. Instead, the solid fiberglass bottom 7 of the boat simply blends into the structurally cored sidewall 8, comprised of a foam or wood core 2 and thermoplastic or fiberglass skins 4 (FIG. 7). In one embodiment of the present invention, an artificial chine 60 is created by grinding or cutting a chine 60 into the fiberglass bottom portion of the hull, where it is sloping upwardly, and just below the point at which the wood or foam portion of the sidewall of the hull starts (FIG. 7A). A flexible drill is then used to drill an injection bore 3 or outlet bore 3a. A drying air injection tube 55 can then be inserted up into the injection bore 3, and none of the decorative surface 4 of the sidewall of the boat has been drilled into.

It is understood that the forgoing are preferred embodiments of the invention, and that various changes and alterations can be made without departing from the broad concepts of the invention.

The invention claimed is:

1. A method for removing internal moisture which tends to collect in hulls, decks, stringers, transoms, bulkheads, spars, and other boat structures comprising:
   forming air injection bores in a core or other boat structure in the vicinity of unwanted moisture; providing a source of pressurized injection air; providing an air injection system comprising a plurality of air injection lines running from said source of pressurized injection air, and inserting said air lines into said bores and thereby pressurized injection air into said bores; controlling the pressure of said air being injected into said bores, and including varying said pressure of said air to a first one or group of several said bores independently from a second one or group of said bores.

2. The method of claim 1 in which the pressure and temperature of said air being injected may be varied as injected into all or a portion of the bores.

3. The method of claim 1 in which multiple pressure regulators are located in said air injection system, at least a first one of the pressure regulators controlling the flow of air into the first one or a group of several bores, and at least a second one of the pressure regulators controlling the flow of air into the second one or group of several bores, so that the air flow and pressure into each pressure regulated line or group of lines can be individually monitored and controlled.

4. The method of claim 3 in which one or more variable output pumps are used to control the flow of air to all the air injection lines and into said bores which they feed.

5. The method of claim 4 in which perforated stainless steel tubes are located on the ends of said air injection lines for inserting into said bores, whereby deeper penetration into said bores is achieved and localized heat is created within the bores because of air friction in said stainless steel tubes.

6. The method of claim 1 in which said structure being treated has in inner surface and an outer surface, and said air injection bores are made to penetrate into said structure from either of said sides, but not penetrate entirely through said structure, stopping at ends which are within said structure; said method further including connecting a vacuum pump to the other of said sides of said structure adjacent said ends of said air injection bores, said vacuum pump being operated to draw air from said air injection bores and through the porous material of said structure and out said other side to be exhausted through said vacuum pump.

7. The method of claim 6 in which said source of pressurized air and said vacuum pump are operated simultaneously to both inject air into said air injection bores and withdraw air through said porous material of said structure.

8. The method of claim 7 in which said vacuum pump is connected to said other side of said structure by boring outlet bores into said structure from said side, such that the inner ends of said outlet bores are adjacent said ends of said air injection bores; said vacuum pump being connected to said air outlet bores by air lines running from said vacuum pump and being inserted into said air outlet bores.

9. The method of claim 1 in which said structure is a curved or angular hull, and a chine is created in said curved or angular hull and said air injection bores are directed generally upwardly into and beyond said created chine.

10. The method of claim 9 in which said air injection bores are formed so as to radiate outwardly in different directions from a point of entry into said chime.

11. The method of claim 1 in which said air injection bores are formed so as to radiate outwardly in different directions from a point of entry into said structure being treated.

12. The method of claim 1 in which a dehumidifier, a plenum, an air pump and a heater are provided, said air pump being said source of air under pressure; said air pump moving ambient air through said dehumidifier to dehumidify said ambient air prior to heating; said dehumidified air being delivered into said plenum, and said air pump delivering air from said plenum, into and through said heater and through said air input lines.

13. The method of claim 12 in which said air pump is a variable output centrifugal blower, which pumps the dehumidified air into said heater via insulated conduit.

14. The method of claim 1 in which a hygrometer measuring moisture and temperature is placed on each one or each of several independent groups of air input lines; said method also providing software monitoring said hygrometers and controlling pressure and temperature as a function of the temperature and humidity of insert air at each hygrometer.

15. A system for removing internal moisture which tends to collect in hulls, decks, stringers, transoms, bulkheads, spars, and other boat structures comprising:

a tool for forming air injection bores in a core or other boat structure in the vicinity of unwanted moisture; a source of pressurized injection air; an air injection system comprising a plurality of air injection lines running from said source of pressurized injection air, for inserting into said bores and thereby injection air into said bores, the air injection system configured for varying the pressure to a first one or group of several said bores independently from a second one or group of several said bores; and a controller for controlling the temperature and humidity of said air being injected into said bores.

16. The system of claim 15 comprising multiple pressure regulators in said air injection system, whereby the control of the pressure to the first one or group of several said bores is varied independently from the control of the pressure to the second one or group of several said bores by connecting a first one of the multiple pressure regulators with the first one or a group of several bores and connecting a second one of the multiple pressure regulators with the second one or group of several bores, so that the air flow and pressure into each pressure regulated line or group of lines and each bore or group of bores can be individually monitored and controlled.

17. The system of claim 16 wherein the air injection lines includes one or more delivery lines and one or more drying air delivery lines, each said delivery line connected to a delivery manifold, and one or more of the drying air delivery lines extending from each said manifold.

18. The system of claim 17 which includes perforated stainless steel tubes located on the ends of said air injection lines for inserting into said bores, whereby deeper penetration into said bores is achieved and localized heat is created within the bores because of air friction in said stainless steel tubes.

19. The system of claim 15 for treating a structure which has in inner surface and an outer surface, and includes a vacuum pump whereby bores can be formed in one side of said structure and said vacuum pump can be connected to the other of said sides of said structure adjacent said ends of said air injection bores, and such that said vacuum pump can be operated to draw air from said air injection bores and through the porous material of said structure and out said other side to be exhausted through said vacuum pump.

20. The system of claim 19 in which both said source of pressurized air and said vacuum pump are operable simultaneously to both inject air into said air injection bores and withdraw air through said porous material of said structure.

21. The system of claim 15 which includes a dehumidifier, a plenum, an air pump and a heater, said air pump being said source of air under pressure; said air pump being set up to move ambient air through said dehumidifier to dehumidify said ambient air prior to heating; said pump also being set up to move dehumidified air into said plenum into said plenum, and said pump also being set up for delivering air from said plenum, into and through said heater and through said air input lines.

22. The system of claim 21 in which said air pump is a variable output centrifugal blower, which pumps the dehumidified air into said heater via insulated conduit.

23. The system if claim 15 which includes a hygrometer measuring moisture and temperature for each one or each of several independent groups of air input lines; said system also comprising software monitoring said hygrometers and controlling pressure and temperature as a function of the temperature and humidity of insert air at each hygrometer.

\* \* \* \* \*